United States Patent
Pedersen et al.

(10) Patent No.: US 12,407,396 B2
(45) Date of Patent: Sep. 2, 2025

(54) BEAM SWITCHING IN WIRELESS COMMUNICATIONS

(71) Applicant: NOKIA TECHNOLOGIES OY, Espoo (FI)

(72) Inventors: Klaus Inegmann Pedersen, Aalborg (DK); Frank Frederiksen, Klarup (DK)

(73) Assignee: NOKIA TECHNOLOGIES OY, Espoo (FI)

(*) Notice: Subject to any disclaimer, the term of this patent is extended or adjusted under 35 U.S.C. 154(b) by 454 days.

(21) Appl. No.: 17/998,636

(22) PCT Filed: May 18, 2020

(86) PCT No.: PCT/EP2020/063755
§ 371 (c)(1),
(2) Date: Nov. 11, 2022

(87) PCT Pub. No.: WO2021/233513
PCT Pub. Date: Nov. 25, 2021

(65) Prior Publication Data
US 2023/0300629 A1   Sep. 21, 2023

(51) Int. Cl.
*H04W 16/28* (2009.01)
*H04W 72/231* (2023.01)

(52) U.S. Cl.
CPC ......... *H04W 16/28* (2013.01); *H04W 72/231* (2023.01)

(58) Field of Classification Search
CPC ............................ H04W 16/28; H04W 72/231
See application file for complete search history.

(56) References Cited

U.S. PATENT DOCUMENTS

| | | | |
|---|---|---|---|
| 2019/0052331 A1* | 2/2019 | Chang | H04B 7/08 |
| 2019/0081687 A1* | 3/2019 | Sadiq | H04W 74/0833 |
| 2019/0124635 A1* | 4/2019 | Nam | H04L 5/0098 |
| 2019/0215701 A1* | 7/2019 | Honglei | H04B 7/0617 |
| 2019/0229789 A1* | 7/2019 | Zhang | H04B 7/0617 |
| 2019/0230529 A1* | 7/2019 | Sadiq | H04L 5/006 |
| 2019/0335491 A1* | 10/2019 | Venugopal | H04L 5/0023 |
| 2020/0186232 A1* | 6/2020 | Levitsky | H04B 7/0617 |
| 2020/0313747 A1* | 10/2020 | Xu | H04B 7/0617 |
| 2021/0037397 A1* | 2/2021 | Guo | H04W 72/046 |
| 2021/0136802 A1* | 5/2021 | Cirik | H04W 72/232 |
| 2021/0306994 A1* | 9/2021 | Venugopal | H04W 72/0446 |
| 2021/0306996 A1* | 9/2021 | Matsumura | H04W 72/20 |
| 2022/0271817 A1* | 8/2022 | Lee | H04B 7/0617 |
| 2023/0028423 A1* | 1/2023 | Xu | H04W 36/06 |
| 2023/0063137 A1* | 3/2023 | Matsumura | H04B 7/088 |

OTHER PUBLICATIONS

International Search Report and Written Opinion for International Application No. PCT/EP2020/063755, mailed on Feb. 11, 2021, 11 pages.

* cited by examiner

*Primary Examiner* — Jael M Ulysse
(74) *Attorney, Agent, or Firm* — Carter, DeLuca & Farrell LLP

(57) ABSTRACT

An arrangement for switching beams in wireless communications is based on determining an exact timing for switching from one beam to another. The determined exact timing is communicated to a user equipment requiring a beam switch. The user equipment receives the determined exact timing and is capable of switching beams in synchronicity with the base station.

1 Claim, 4 Drawing Sheets

BEAM SWITCHING IN WIRELESS COMMUNICATIONS

CROSS-REFERENCE TO RELATED APPLICATIONS

This application is a national stage entry of International Application No. PCT/EP2020/063755, filed May 18, 2020, entitled "BEAM SWITCHING IN WIRELESS COMMUNICATIONS" which is hereby incorporated by reference in its entirety.

DESCRIPTION OF BACKGROUND

The field of this disclosure is wireless communications. Particularly the disclosure relates to wireless communications using multiple beam transmission. During the last decades the need for data communication capacity has increased. Mobile communication networks, wireless local area networks and similar wireless communication arrangements have been continuously improved by introducing new features and technologies to increase the data transfer capacity. The need for capacity is not limited to the maximum transfer rate between a user equipment and a serving network station but also the overall capacity to serve a high number of users is often very important. This is particularly the case of mobile networks because they are commonly used to cover large areas that may have a very high number of persons wishing to use the data transfer capacities of their possibly multiple devices.

One commonly used solution is s to use beamforming in wireless communication. This means that the transmitter, such as a base station of a mobile network, uses a specific beam to focus the wireless signal towards the receiving user equipment. With beam forming it is possible to improve the link quality so as to provide higher data rates and more reliability than by a conventional broadcast antenna transmitting to all directions.

In case of mobile devices, such as mobile phones using a mobile communication network or a portable computer using a local area network, the beam used for transmissions may need to be changed as the device moves away from the coverage of the earlier beam. There may also be other reasons for changing the used beam, for example, because of load balancing between beams or any other reason. The number of beams may be high so that sometimes very narrow beams form a grid of beams that are partially overlapping each other. A base station may comprise a plurality of transmission antennas and each of them commonly comprises two or more transmission beams. When the number of beams is high and consequently the beams cover a smaller geographical area the need for switching from a beam to another occurs more often.

If the beam needs to be changed a conventional solution is that the transmitting base station communicates a change of the beam to the receiving device. The receiving device will assume the beam change immediately after receiving the instructions. However, the transmitting base station does not know exactly when the receiving device has received the message instructing the beam change. Thus, there is a period of uncertainty during which the base station and the receiving device may be using or assuming different beams being used. The period of uncertainty can cause inefficiency of data transfer and increased latency.

SUMMARY

In the following, an arrangement for switching beams in wireless communications based on determining an exact timing for switching from one beam to another is disclosed. The determined exact timing is communicated to a user equipment requiring a beam switch. The user equipment receives the determined exact timing and is capable of switching beams in synchronicity with the base station.

In an aspect a method for a network element is disclosed. The method comprises detecting a need for switching a transmission beam between a network element and user equipment; determining a timing for switching the transmission beam; transmitting the determined timing to the user equipment using a message; and switching the transmission beam between the network element and the user equipment according to the transmitted timing.

A benefit of the aspect is that it provides a possibility to indicate an exact moment in time for switching beams. This leads to improved performance of the data transfer as both the network element and the user equipment change the beams at the same moment and transmissions lost due to uncertainty with regard to the beam to be used are reduced. This improves both the latency, the reliability and the throughput at the moment of the beam switching.

In an example embodiment of the aspect the method further comprises transmitting the determined timing to the user equipment using as a message one of the following: PDCCH order, MAC control element or RRC signaling. It is beneficial to use one of the existing messaging means so that the changes required for the rest of the arrangement are small. Furthermore, it is beneficial to use a messaging means that is frequently transmitted or can be transmitted when needed so that the switching can happen at the earliest convenience.

In an example embodiment of the aspect, the method further comprises providing an additional field in the message. It is beneficial to add a field to the existing message so that the existing information transmitted by the message does not need to be reduced. Such an addition may be achieved by using spare or reserved information bits in the signaling message.

In an example embodiment of the aspect, the additional field is configured to indicate the timing for switching using a predetermined number of bits. It is beneficial to use a predetermined number of bits so that when the bits are allocated in groups of 8 bits or any other number of bits, only the required bits are used and the other bits may be saved for a later use.

In an example embodiment of the aspect the predetermined number of bits are indicating a timing for switching based on at least one of the following: system frame number, number of slots within the system frame number and symbols or mini-slots within the slot. It is beneficial to use existing data structures to which the timing is particularly pointed. Furthermore, it is beneficial to facilitate the use of different resolutions so that if additional bits are not available, a more coarse pointing in time can be used.

In an example embodiment of the aspect the method further comprises performing the switching the transmission beam by changing the state of the respective transmission configuration indicator. It is beneficial to use changing the state of the respective transmission configuration indicator when switching beams as it is an efficient way of switching beams.

In another aspect a method for a user equipment is disclosed. The method comprises receiving a determined timing to the user equipment using a message; and switching the transmission beam between the network element and the user equipment according to the received determined timing.

A benefit of the aspect is that it provides a possibility to indicate an exact moment in time for switching beams. This leads to improved performance of the data transfer. As both the network element and the user equipment change the beams at the same moment and transmissions lost due to uncertainty with regard to the beam to be used are reduced. This improves both the latency and the bandwidth at the moment of beam switching.

In an example embodiment of the aspect, the method further comprises receiving the determined timing from a network element using as a message one of the following: PDCCH order, MAC control element or RRC signaling. It is beneficial to use one of the existing messaging means so that the changes required for the rest of the arrangement are small. Furthermore, it is beneficial to use a messaging means that is frequently transmitted or can be transmitted when needed, so that the switching can happen at the earliest convenience.

In an example embodiment of the aspect, the method further comprises extracting an additional field in the message. It is beneficial to add a field to the existing message so that the existing information transmitted by the message does not need to be reduced. Such an addition may be achieved by using spare or reserved information bits in the signaling message.

In an example embodiment of the aspect, the additional field is configured to indicate the timing for switching using a predetermined number of bits. It is beneficial to use a predetermined number of bits so that when the bits are allocated in groups of 8 bits or any other number of bits, only the required bits are used and the other bits may be saved for a later use.

In an example embodiment of the aspect, the predetermined number of bits are indicating a timing for switching based on at least one of the following: system frame number, number of slots within the system frame number and symbols or mini-slots within the slot. It is beneficial to use existing data structures to which the timing is particularly pointed. Furthermore, it is beneficial to facilitate the use of different resolutions so that if additional bits are not available, a more coarse pointing in time can be used.

In an example embodiment of the aspect, the method further comprises performing the switching the transmission beam by changing the state of the respective transmission configuration indicator. It is beneficial to use changing the state of the respective transmission configuration indicator when switching beams as it is an efficient way of switching beams.

In an aspect a network element is disclosed. The network element comprises: an antenna part configured to transmit using at least two beams; and a circuitry configured to perform a method as disclosed above. When performing the method as disclosed above the aspect shares the benefits and the effects of the method.

In another aspect a network element is disclosed. The network element comprises means for detecting a need for switching a transmission beam between a network element and user equipment; means for determining a timing for switching the transmission beam; means for transmitting the determined timing to the user equipment using a message; and means for switching the transmission beam between the network element and the user equipment according to the transmitted timing. The network element further comprises means for performing a method as disclosed above. When performing the method as disclosed above the aspect shares the benefits and the effects of the method.

BRIEF DESCRIPTION OF THE DRAWINGS

The accompanying drawings, which are included to provide a further understanding of the beam switching in a wireless communications arrangement and constitute a part of this specification, illustrate example embodiments and together with the description help to explain the principles of the beam switching in wireless communications. In the drawings.

DETAILED DESCRIPTION

Reference will now be made in detail to the example embodiments, examples of which are illustrated in the accompanying drawings.

The following example relates to a fifth generation (5G) mobile telecommunication network technology, also known as New Radio (NR). In the example a 5G NR arrangement is used with a grid-of-beams (GoB) at the next generation NodeB (gNB). The example involves using ultra-reliable low latency (URLLC) as in Rel-15, enhanced URLLC (eURLLC) as in Rel-16, and time sensitive control (TSC) as in Rel-16. The release numbers are referring to a new radio standard of the $3^{rd}$ generation partnership project (3GPP).

In the example, URLLC/eURLLC traffic is typically characterized by random packet arrivals with latency constraints of 0.5-1.0 ms at 10e-6 to 10e-5 reliability levels. TSC traffic is typically having deterministic packet arrival and extreme strict jitter requirements in addition to the latency/reliability requirements known from (e) URLLC. Fulfilling the (e) URLLC/TSC requirements requires very accurate link adaption for every packet transmission, such that the transmissions can be decoded successfully. Especially TSC use cases are challenging, as the delay budget does often not allow for any hybrid automatic repeat request (H-ARQ) retransmissions. In a mobile environment (i.e. users moving) where the gNB uses a grid of beams, beam switching will sometimes occur.

Even if the example is discussed herein in a very detailed manner, a person skilled in the art understands that the same principles can be achieved also in other similar arrangements requiring beam switching. The benefits are not limited to the arrangements with low or ultralow latency requirement, but provide improved efficiency and lower latency in various kinds of systems with beam switching.

Figure 1:
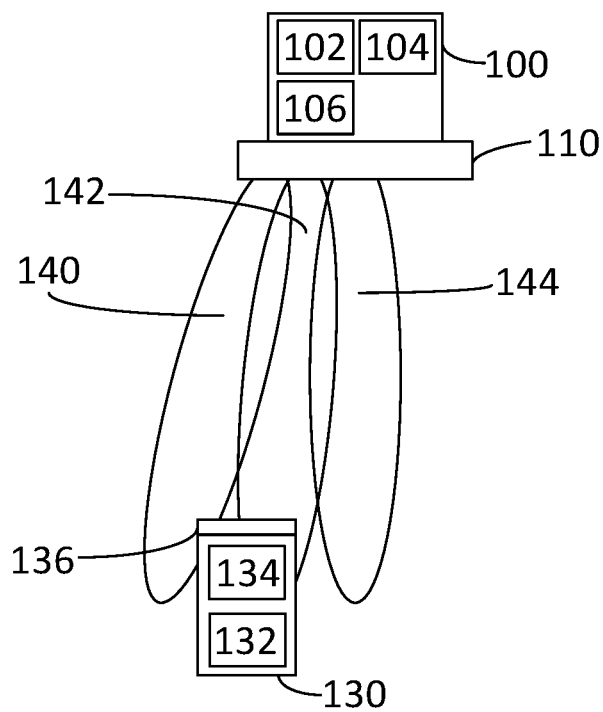
FIG. 1 is an example of an arrangement with beam switching.

FIG. 1 discloses an example of an arrangement with beam switching. The arrangement comprises a base station 100, which is an example of a network element, and a user equipment 130. The base station 100 communicates with the user equipment 130 and possible other user equipment devices using multiple beams 140-144. Typically one base station communicates with one particular user equipment using one beam, however, it is possible that the base station communicates with a UE using more than one beam. Thus, when a user equipment moves from a geographical coverage of one beam to another, the beam used for communication needs to be switched. One beam may be used to serve a plurality of user equipment devices at the same time. The number of beams is only an example and it may be considerably higher so that a grid of beams is formed. In FIG. 1 only one base station 100 is communicating with the user equipment 130. This is chosen only for illustrative purposes, and it is understood that modern user equipment devices, such as the user equipment 130, can communicate with a plurality of base stations. The plurality of base stations typically includes a number of different technologies that may be used for communication.

In the example of FIG. 1 the base station 100 is an arrangement including a gNB of a fifth generation telecommunication network. The purpose of the base station 100 is to communicate with the user equipment 130, which in the example of FIG. 1 is a 5G mobile telephone or a similar device. Instead of a mobile phone, the user equipment may be a tablet computer, an ordinary laptop computer or any device involving the so called Internet of Things. An example of such a device includes cars and other vehicles that can be connected. In many cases the need for switching beams occurs because the user equipment 130 moves; however, this is not always necessary. The need for switching beams may occur because something moves between the user equipment 130 and the base station 100. A similar need for switching beams may occur if the communication is otherwise interfered or the current beam is overloaded.

In the example of FIG. 1 the base station comprises a circuitry for performing tasks of a base station. These include a processor 102, a memory 104 and a connection to other networks 106. In the example of FIG. 1 the base station further comprises an antenna part 110 being capable of transmitting a plurality of beams. The tasks of the processor 102 include deciding which beam is used for a particular user equipment and the memory 104 is used for storing such information. The tasks of the processor and memory are not limited to these, but they may contribute to several different tasks. FIG. 1 shows only one processor and memory because of simplicity. A base station 100 may include more than one processor and more than one memory, which both may be of similar and/or different types. The network connection 106 communicates with the core network and generally transmits data to other base stations and other networks. Additionally, the network connection 106 may include connections, for example for maintenance persons.

In the example of FIG. 1 the user equipment 130 comprises a circuitry for communicating with base stations and also for performing other tasks. The circuitry includes a processor 132 and a memory 134. The user equipment further comprises an antenna part 136 that can be used for communicating with different network technologies. In the example of FIG. 1 we can assume that the user equipment 130 is communicating with the base station 100 using the beam 142. If we assume that there is a need to change to another beam, such as beam 140, the change will be initiated by the base station 100 by first determining a need for switching and then communicating the beam switching to the user equipment 130.

Figure 2:
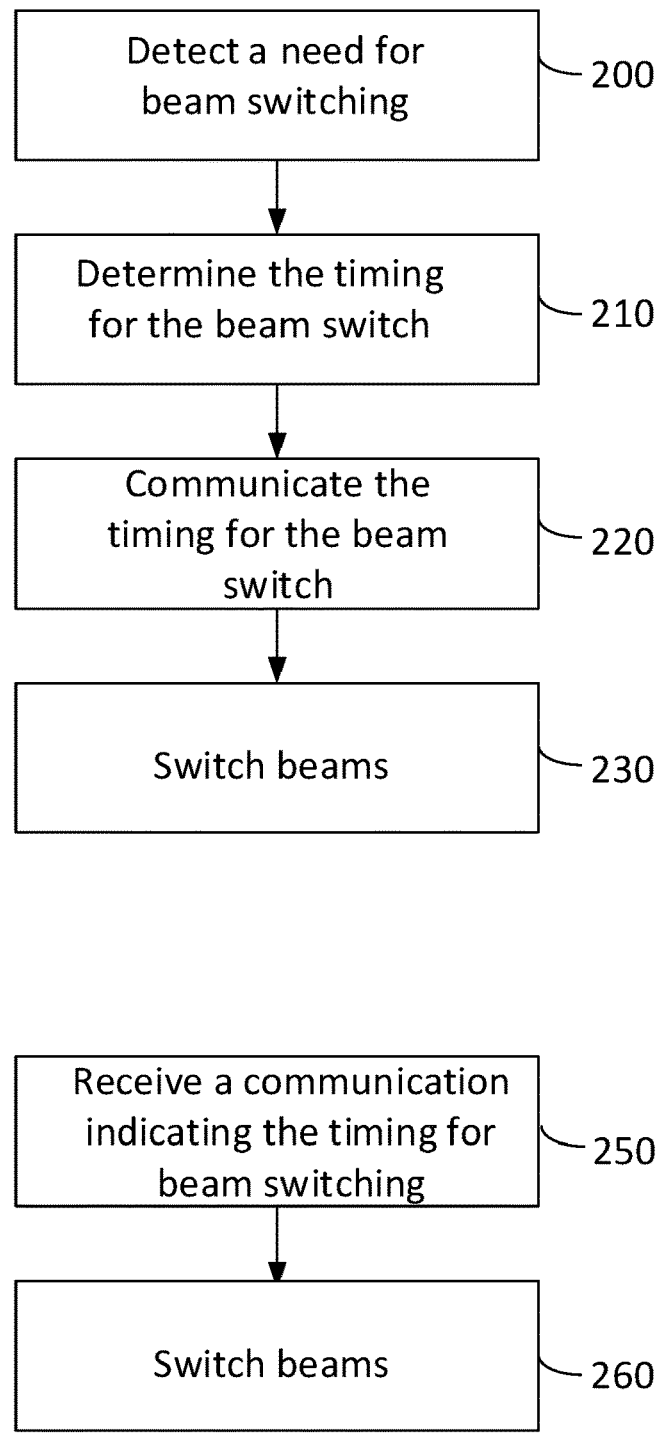
FIG. 2 illustrates two examples of a method for an arrangement with beam switching.

In FIG. 2, two examples of a method have been disclosed. In the first method, functionality at the base station is disclosed. The base station continuously monitors the quality of the communication channel and detects a need for beam switching, step 200. The actual measurements relating to the monitoring can be performed either in the base station itself or in the user equipment. The user equipment then transmits the measurement results to the base station. The need for switching is based on determining that a different beam could provide better communication efficiency. In such case the base station determines the timing for the beam switch, step 210. The base station typically changes the beam at the earliest convenience, but optimally at the same time with the user equipment. The determined timing is communicated to the user equipment, step 220. The communication may be in the form of absolute time or relative time or it may be based on other transmission parameters, such as a change on a particular radio frame, subframe, slot, symbol, or mini-slot. A more detailed example will be given below. Then, at the communicated timing, the base station will switch beams, step 230.

In FIG. 2 a second example of a method in a user equipment is shown. In the second method, functionality at the user equipment is disclosed. The user equipment is communicating with the base station and receives an indication of the timing for beam switching, step 250. The user equipment continues to communicate using the existing beam until the indicated timing is reached and switches beams, step 260. This provides synchronized beam switching and the loss of packets is reduced.

In FIG. 2, two methods relating to decision making at a base station are shown. The same principles may also be used the other way around, so that the user equipment makes a decision and communicates it to the base station. Furthermore, in such implementation it is possible that the user equipment only indicates a need for beam switching, and the base station verifies it and decides the exact timing.

In the examples of FIG. 2 the actual beam switching may be done by changing the state of the respective transmission configuration indicator. The information relating to the beam is not discussed above, as it needs not to be changed, and the mechanism used by the underlying technology may be used as it was without the exact timing information.

In the examples relating to the following figures, a more detailed explanation on the principles described above will be given. In the examples relating to the following figures, an extended medium access control (MAC)-based time-synchronized beam switching scheme is described. In the scheme it is ensured that the gNB and user equipment have exactly the same understanding of when a beam switch happens. For the downlink, this will ensure that the gNB transmits a control message (DCI or MAC-CE) to the UE through a certain beam. The UE will aim to decode from that very same beam. The examples described include exact timing information in the MAC control element (MAC-CE) message on when the beam switch will happen, such that it is known at both the gNB- and UE-side when new transmission/receptions will take place through a new beam. By introducing such enhancements, there is full synchronicity between the gNB and UE as well as gapless switching of the configuration. This means that the gNb and UE always have the same understanding of which beam is used for transmission/reception, and thus potential beam misalignments that would result is failures due to mismatch of the used beam at the gNB and assumed beam by the UEs are avoided or at least reduced.

In the following, an example using MAC-based beam switching in a 5G arrangement using a modified MAC-CE is discussed. In MAC-based beam switching a gNB provides beam indication information to inform the UE which download beam is to be used for downlink so that the UE can select a proper upload beam, and which download beam is used for uplink so that the UE's download is directed towards the used RX beam at the gNB. This information is signaled in the modified MAC-CE element message of transmission configuration information (TCI). In a 3GPP NR MAC Specification TS 38.321, the conventional TCI MAC-CE has a fixed size of 16 bits and consists of the following fields: Serving Cell ID, CORESET ID and TCI State ID. In the following example the MAC-CE is extended by using one additional octet, wherein at least a portion of the additional octet is used for timing information. The MAC-CE has conventionally been organized in a resolution of octets. Thus, even if the whole octet may not be needed for the timing information, it is a beneficial choice as it reduces the need for further changes in MAC-CE related functionality. The unused bits in the additional octet may be reserved for future use.

Figure 3:
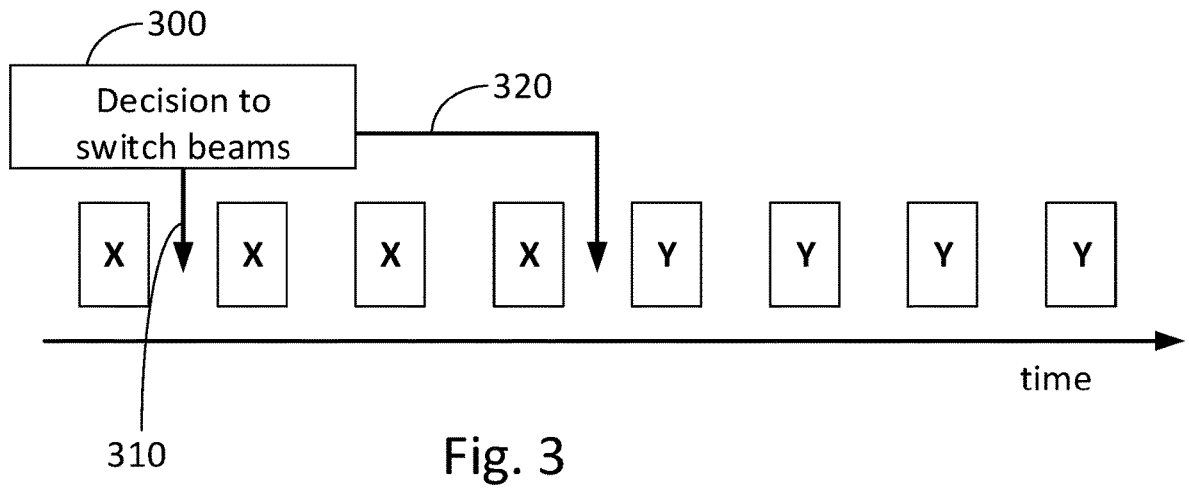
FIG. 3 is an example illustration of a basic situation in beam switching.

FIG. 3 illustrates a basic situation of beam switching. In the example of FIG. 3 a user equipment is receiving using beam X. Transmission using beam X is illustrated by transmissions with character X. The transmissions are then switched to be communicated using beam Y. Transmissions using beam Y are accordingly illustrated by transmissions with Y. Once the gNB decides 300 to perform a beam switch for the UE, it sends the enhanced or alternative MAC-CE command for time synchronized beam switch, also known as time synchronized TCI state indication. This is illustrated by arrow 310. The aforementioned MAC-CE command includes specific timing information on when the beam switch shall be made, such that there is full synchronicity between the gNB and UE for switching from beam X to beam Y. More specifically, there will be full synchronicity of when the TCI state is switched at the UE and the gNB side, including the introduction of gapless switching at the agreed time. Hence, at the exact time of the beam switch, which is indicated by arrow 320, the gNB starts scheduling the UE from beam Y and the UE starts listening to transmissions from beam Y using the TCI state corresponding to beam Y. Up till that time, the gNB transmits to the UE through beam X, and the UE only listens to transmissions through beam X using the TCI state information that corresponds to beam X.

Figure 4:
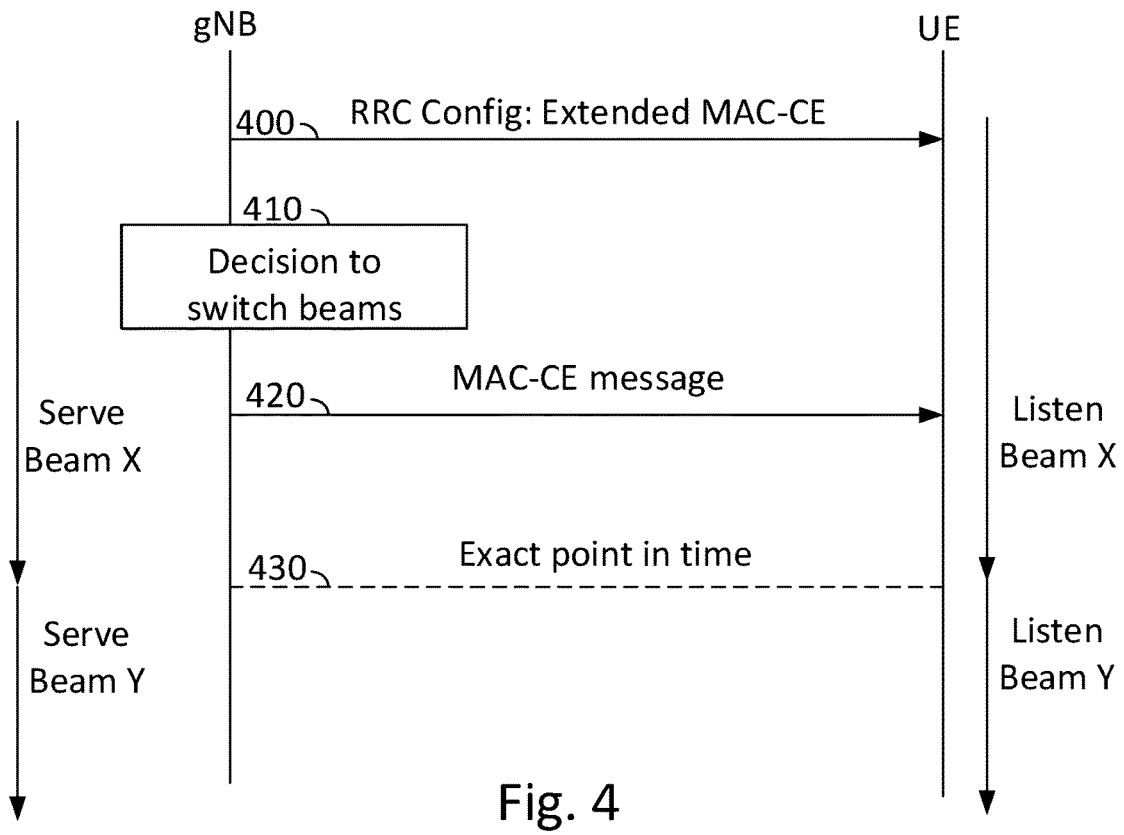
FIG. 4 shows an example of the corresponding gNB-UE signaling flow diagram.

FIG. 4 shows an example of the corresponding gNB-UE signaling flow diagram. In the example of FIG. 4 it is shown that the gNB first configures the UE to operate in a mode with strictly time-synchronized beam switching behavior, step 400, which is equivalent to time-synchronized TCI state indication. Such configuration is suggested to be implemented by means of higher layer RRC signaling. At some point in time, the gNB makes a decision to switch the transmissions to the UE from beam X to beam Y, step 410. Such beam switching decisions by the gNB may be based on e.g. RSRP measurements feedback from the UE, or on any other similar reason for determining a need for beam switching. The gNB sets the timing for the actual beam switching as part of the MAC-CE command that it sends to the UE, step 420. The gNb will set the timing of the beam switching such that it accounts for the required number of HARQ transmissions, the UE PHY and MAC processing times and the like, so that the UE has enough time to receive and process the sent message.

If the gNB-UE link operates with 30 kHz subcarrier specific and TTI sizes of 2-symbols mini-slots, and UE processing capability 2 (aka URLLC UE), the timing of the beam switch may be set to just be 1-2 ms into the future. If the UE processing capability is 1 (aka eMBB UE with slow processing times) and longer TTI sizes are used, the timing of the beam switch may be set to be 3-10 ms into the future. Similarly, in case of TDD, the radio frame configuration (i.e. UL/DL switching pattern) may also be taken into account when the gNB sets the timing of the beam switch. Finally, as also illustrated in FIG. 4, at the exact time of the beam switch, step 430, both the gNB and UE start to communicate through the new beam, namely beam Y.

Figure 5:
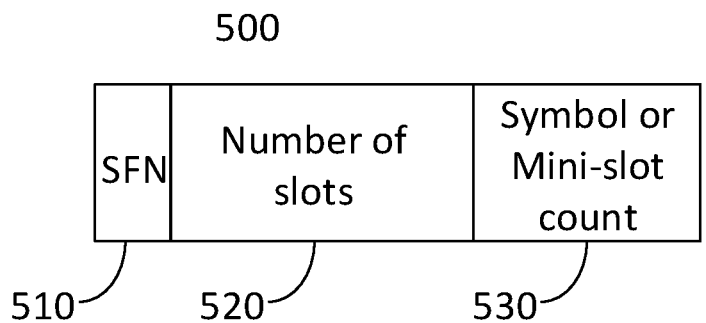
FIG. 5 is an example of a structure of an octet expressing the point in time where the beam switch happens.

In FIG. 5, an example of a structure of an octet expressing the point in time where the beam switch happens is shown. As explained above, the timing of beam switching is expressed as part of the MAC-CE command with the time-synchronized beam switch instruction. Following the general philosophy of the MAC-CE design to have it organized in a resolution of octets, the following example uses one octet (8-bits) for expressing the point in time. In is also possible to use less bits for expressing the time. However, as any MAC-CE is octet-aligned, expanding the MAC message will cause 8 additional bits to be transmitted. Some of these may be reserved for future use instead of using all for a given feature.

The timing of beam switch in the example of FIG. 5 is expressed relative to the system frame number (SFN) boundary, divided into three different components as also illustrated in FIG. 5, wherein the octet 500 is divided into three different components. The first component is a single bit SFN indicator 510. If the value is set to 0, the TCI state switch will be applied within the same SFN as where the MAC-CE is sent. If it is set to 1, the TCI state switch will happen in the next SEN compared to the SEN where the MAC-CE is sent. A second component 520 comprises four bits expressing the number of slots into the radio frame where the beam switch (or TCI state switch) happens. The third component 530 comprises three bits expressing the number of symbols, or mini-slots, into the slot where the beam switch shall happen. In case this is expressed in a resolution of mini-slots, the RRC Config message as illustrated in FIG. 4 may include information of the mini-slot resolution used for the UE, for example enumerated as 2-symbols, 4-symbols, or 7-symbols.

Figure 6:
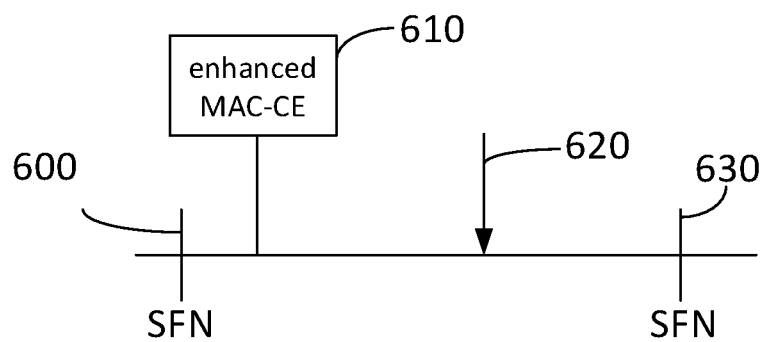
FIG. 6 is an example of an octet based exact timing of a beam switching arrangement.
Figure 7:
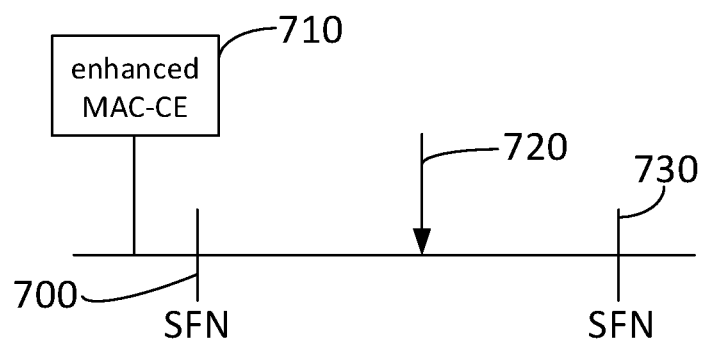
FIG. 7 is a second example of an octet based exact timing of a beam switching arrangement.

In FIGS. 6 and 7, two examples of an octet based exact timing of a beam switching arrangement are shown. In the example of FIG. 6 the enhanced MAC-CE 610 is sent after the SFN boundary 600. The enhanced MAC-CE 610 indicates the exact timing 620 of beam switching before the next SFN boundary 630. Thus, the beam switching is taking place within the same radio frame where it has been communicated. Thus, following the structure presented in the example of FIG. 5 the octet may be set to 01110010. In that case the first component is 0, the second component is 1110 and the third component is 010. The first component means that the beam switching takes place within the current SEN, the second component means 15 slots into the frame and the third component means 2 symbols in the slot.

In the example of FIG. 7 the enhanced MAC-CE 710 is sent before the SEN boundary 700. The enhanced MAC-CE 710 indicates the exact timing 720 of beam switching before the next SFN boundary 730. Thus, the beam switching is taking place within the next radio frame relative to where it has been communicated. Thus, following the structure presented in the example of FIG. 5 the octet may be set to 10010000. In that case the first component is 1, the second component is 0010 and the third component is 000. The first component means that the beam switching takes place within the next SFN, the second component means 2 slots into the frame and the third component means 0 symbols in the slot.

Above, a detailed example using an enhanced MAC-CE has been discussed. The presented approach discloses only an example, and similar principles may be implemented using other signaling means, such as PDCCH order or group-common DCI, which are physical layer signaling methods using the physical downlink control channel (PDCCH). Another option is using higher layer signaling, such as RRC signaling. The signaling may also be two-fold, where, for example, the exact timing is pre-configured using RRC signaling and PDCCH is used to trigger the action.

In the detailed example above an arrangement using an SFN with slots and symbols has been disclosed. This an example with very specific timing. If the requirement is less strict, it is possible to omit the information with regard to symbols or even slots, in which case only one bit is needed to identify that the beam switching is performed at the beginning of the next SFN. The principles discussed above have been presented in view of New Radio. Thus, the number of bits required to indicate slots and symbols may be different in different networking technologies. However, the principle suggested above also works in technologies where the indication of exact timing requires two or more octets instead of only one.

In the example above the exact timing is based on SEN, slot and symbol numbers. Instead of this a specific moment of time may be used if the used network technology provides accurate timing.

As stated above, the components of the exemplary embodiments can include a computer readable medium or memories for holding instructions programmed according to the teachings of the present inventions and for holding data structures, tables, records, and/or other data described herein. A computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD+R, CD+RW, DVD, DVD-RAM, DVD+RW, DVD+R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

As used in this application, the base station and/or user equipment may comprise a circuitry. The term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and/or processor(s), such as a microprocessor(s) or a portion of a microprocessor(s), that requires software (e.g., firmware) for operation, but the software may not be present when it is not needed for operation.
This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

An example of an access architecture that may be applied may be e.g. a radio access architecture based on long term evolution advanced (LTE Advanced, LTE-A) or new radio (NR, 5G), without restricting, however, the example embodiments to such an architecture. It is obvious for a person skilled in the art that the example embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), wideband code division multiple access (WCDMA), systems using ultra-wideband (UWB) technology, sensor networks, mobile ad-hoc networks (MANETs) and Internet Protocol multimedia subsystems (IMS) or any combination thereof.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

It is obvious to a person skilled in the art that with the advancement of technology, the basic idea of the beam switching may be implemented in various ways. The beam switching and its example embodiments are thus not limited to the examples described above; instead they may vary within the scope of the claims.

The invention claimed is:
1. An apparatus comprising:
at least one processor; and
at least one memory including computer program code;
the at least one memory and the computer program code configured to, with the at least one processor, cause the apparatus at least to:
receive a timing from a network element for switching a transmission configuration information (TCI) state and a transmission beam between a network element and user equipment via a message, wherein the message is a PDCCH order, a MAC control element or RRC signaling, wherein the received timing is determined based on a processing capability of the user equipment and a required number of hybrid automatic repeat request (HARQ) transmissions;

extract an additional field in the message, wherein the additional field is configured to indicate the timing for switching using a predetermined number of bits, wherein the predetermined number of bits are indicating a timing for switching based on system frame number, a number of slots within the system frame number, and a number of symbols or mini-slots within the slot;

receive a time synchronized TCI state indication for switching the TCI state, wherein the time synchronized TCI state indication enables gapless and coordinated switching of the TCI state between the network element and the user equipment; and switch the TCI state and the transmission beam between the network element and the user equipment according to the received timing.

\* \* \* \* \*